United States Patent [19]

Colarelli, III et al.

[11] Patent Number: 5,774,361
[45] Date of Patent: Jun. 30, 1998

[54] CONTEXT SENSITIVE VEHICLE ALIGNMENT AND INSPECTION SYSTEM

[75] Inventors: Nicholas J. Colarelli, III, Creve Coeur; Timothy A. Larson, Ferguson; Timothy A. Strege, Ballwin; Daniel B. January, St. Peters, all of Mo.

[73] Assignee: Hunter Engineering Company, Bridgeton, Mo.

[21] Appl. No.: 502,497

[22] Filed: Jul. 14, 1995

[51] Int. Cl.[6] .................................................. G06F 17/30
[52] U.S. Cl. ........................... 364/424.034; 364/424.038; 364/559
[58] Field of Search ..................... 364/424.034, 424.038, 364/559, 551.01; 33/203.18

[56] References Cited

U.S. PATENT DOCUMENTS

| | | | |
|---|---|---|---|
| Re. 33,144 | 1/1990 | Hunter et al. ........................... | 356/152 |
| 4,381,548 | 4/1983 | Grossman et al. ....................... | 364/551 |
| 4,574,490 | 3/1986 | Curchod ................................. | 33/203.18 |
| 4,752,908 | 6/1988 | Bouillot ................................. | 364/900 |
| 4,899,292 | 2/1990 | Montagna et al. ...................... | 364/521 |
| 5,128,859 | 7/1992 | Carbone et al. ........................ | 364/401 |
| 5,414,626 | 5/1995 | Boorse et al. ...................... | 364/424.03 |
| 5,432,904 | 7/1995 | Wong ..................................... | 395/161 |

*Primary Examiner*—Michael Zanelli
*Attorney, Agent, or Firm*—Polster, Lieder, Woodruff & Lucchesi, L.C.

[57] ABSTRACT

A vehicle alignment and inspection system is provided which uses context sensitive information from several sources to enable the user/operator to achieve a more efficient alignment or inspection than previous systems. Features include digital photographs responsive to point-and-click operations by the operator, drop-down menus allowing direct access to specific operations, a database of tools and parts required for the job, and a "smart" alignment procedure.

42 Claims, 6 Drawing Sheets

```
Left and right rear toe are ok.
Left and right rear camber are ok.
Right front caster is not within the specified tolerances.
Left front caster is ok.
Left and right front toe are ok.
etc.
```
```
Right front caster must be adjusted.
Because caster will be adjusted, front toe will also have to be adjusted
```

FIG. 9

```
Left rear toe is not within the specified range.
Left rear camber is not within the specified range.
etc.
```
```
Left rear camber and toe can be adjusted using a shim.
Left rear toe can be adjusted using a built in cam.
```

FIG. 10

```
Rear Camber (No OEM adjustment)
    Adjustment Parts and Kits:
        Hunter      RP-41-160    Magna Cam -16mm     0.5h
        Northstar   41-160       Magna Cam -16mm     0.5h
        Specialty   8211         Eccentric Cam Kit   1.2h
    Recommended Tools:
        Wrench/Socket - 3/4"(2)
        C-Clamp 6"
    Special Tools:
        Hunter      RP-88-8923   Special Tool for "W" Body (1990→)
        Northstar   41-345       Special Tool for "W" Body (1990→)
```

FIG. 11

```
Rear Camber (OEM Mechanical Adjustment)
    Recommended Tools:
        Wrench/Socket - 1/2"
        Wrench/Socket - 5/16"
        Screwdriver - large
```

CONTEXT SENSITIVE VEHICLE ALIGNMENT AND INSPECTION SYSTEM

BACKGROUND OF THE INVENTION

The present invention relates to vehicle inspection and alignment, and more particularly to systems which facilitate the inspection and alignment of a plurality of different makes and models of vehicles.

Vehicle suspension and steering components are subject to wear, misadjustment, and failure. This results in various symptoms which, however, do not always unambiguously indicate the particular component which needs to be replaced or adjusted. Moreover, it is not always possible for the technician/user, particularly one who works on a great number of different models and makes of vehicles, to quickly and accurately determine the actual cause of any particular symptom. This results in increased repair time and costs and the possible replacement of undamaged parts.

There are books available which may be used by the technician to diagnose a particular problem or symptom, but the books are not always available to the technician at the time they are needed. In addition, the books are bulky, are easily soiled, and generally are not a satisfactory solution.

Various alignment equipment is available to the technician to assist in determining whether various alignment angles, such as toe, caster and camber are within specifications, but this information alone still does not always unambiguously define the cause of a particular symptom. The available equipment, however, tends to have a standard alignment procedure which it follows no matter what the alignment status of the actual vehicle being inspected or aligned. Other equipment imposes no order on the alignment process at all, with the result that unnecessary procedures could be performed by the technician and necessary procedures might be omitted. The situation is complicated by the fact that not all angles are adjustable on all vehicles, different techniques are used to adjust the same angles on different vehicles, and the tools used to optimally adjust the angles may also vary from vehicle to vehicle.

Still other available alignment equipment allows the technician access to all the various possible alignment operations, but only by searching through the available operations in a predetermined order. Such a system could be improved.

Various pieces of information would be useful to the technician/operator in inspecting and/or aligning a vehicle. Among those are the Motorist Assurance Program (MAP) Uniform Inspection Guidelines and various part related information, such as part names, part descriptions, and part suppliers. Such information, while available separately, is not an integral part of conventional alignment and inspection systems. In addition, it would be extremely helpful if the tools required for a particular alignment operation could be consistently and readily identified before the operation is commenced.

It is known that various alignment angles are dependent on each other. For example, when caster is adjusted, it is also necessary to adjust front toe. It would, therefore, be helpful to the technician to have an initial report of the alignment status of the vehicle to determine the best way to proceed to completely align the vehicle. Such a report could be reassuring to the customer. Moreover, occasionally all the values are completely within specifications and an initial report would immediately reveal that fact to the technician. Once the initial alignment status of the vehicle is known, it would be advantageous to perform the alignment procedures in the order which requires the minimum number of steps. Although an experienced technician can often minimize the number of operations required, it would be advantageous to eliminate the guesswork and uncertainty from this determination.

SUMMARY OF THE INVENTION

Among the various objects and features of the present invention is the provision of a vehicle alignment and inspection system which guides the technician/operator through the inspection and alignment process.

A second object is the provision of such a system which integrates information such as guidelines, parts information, and tool information with the inspection and alignment process automatically.

A third object is the provision of such a system which reduces the amount of knowledge required of the technician/operator.

A fourth object is the provision of such a system which reduces technician/operator uncertainty.

A fifth object is the provision of such a system which provides a report of the initial alignment status of the vehicle to facilitate the job of the technician/operator and satisfy the customer.

A sixth object is the provision of such a system which minimizes the number of operations required to completely align a vehicle, based upon the initial alignment status of the vehicle.

A seventh object is the provision of such a system which provides direct access to additional information for the technician during the inspection and/or alignment process.

An eighth object is the provision of such a system which facilitates the assessment of the conditions of various parts during an inspection procedure.

A ninth object is the provision of such a system which displays visual representations (including full motion video representations) of the vehicle under inspection.

A tenth object is the provision of such a system which allows the technician/operator to obtain additional information (including full motion video information) about particular tools and parts depicted therein by a simple point-and-click procedure, which information can include video information concerning how to inspect a selected part.

Other objects and features will be in part apparent and in part pointed out hereinafter.

Briefly in a first embodiment of the present invention, a vehicle alignment system includes sensors for obtaining vehicle alignment data from a vehicle under test, a controller operatively connected to the sensors for determining measured vehicle alignment angles from the vehicle alignment data, and a display for visually displaying to an operator graphical representations of the measured vehicle alignment angles. The display is operatively connected to the controller so that the controller causes the display of graphical representations of a plurality of different measured vehicle alignment angles at one time. An input device is operable by the operator to select the graphical representation of a desired one of the plurality of different measured vehicle alignment angles being displayed. A memory has stored therein, for each selectable vehicle alignment angle, a list of a plurality of different operations associated with that particular selectable vehicle alignment angle. (As used herein, "list" means any representation of choices, which may include a set of text items, a set of graphical items, etc.) The controller is operatively connected to the input device and to the memory such that, upon selection of a selectable vehicle alignment angle by the operator, the controller retrieves the list of different operations associated with the selected vehicle alignment angle and causes the display of the list on the display.

In a second aspect of the present invention, a vehicle alignment system includes sensors for obtaining vehicle alignment data from a vehicle under test, a controller operatively connected to the sensors for determining measured vehicle alignment angles from the vehicle alignment data, and a display for visually displaying to an operator graphical representations of the measured vehicle alignment angles. The display is operatively connected to the controller so that the controller causes the display of at least some of the graphical representations. A manually operable input device is provided for requesting direct access to any of a plurality of alignment assisting operations associated with a measured vehicle alignment angle corresponding to a displayed graphical representation. The controller is responsive to a request for direct access to a particular operation to directly initiate said requested operation.

In a third aspect of the present invention, a vehicle inspection system includes a storage device for storing a plurality of separate images and a display screen for visually displaying the images to an operator/technician. At least some of the separate images illustrate a plurality of vehicle parts. A manually operable input device is provided for signalling the selection of a desired portion of a displayed image. A controller is operatively connected to the manually operable input device and responsive to the locations of particular vehicle parts on the displayed image to visually identify on the display screen a vehicle part corresponding to the selected portion of the displayed image.

In a fourth aspect of the present invention, a vehicle inspection system includes a storage device for storing a plurality of separate images and a display screen for visually displaying the images to a user/operator. At least some of the separate images illustrate a plurality of vehicle parts. A manually operable input device is included for signalling the selection of a desired portion of a displayed image and for inputting information concerning vehicle part conditions. A controller operatively connected to the manually operable input device is responsive to the locations of particular vehicle parts on the displayed image to associate the vehicle part condition information with a vehicle part corresponding to the selected portion of the displayed image. It is preferred that the storage device have stored therein full motion video representations illustrating the inspection process for a selected part.

In a fifth aspect of the present invention, a system for facilitating vehicle alignment includes a plurality of sensors for acquiring vehicle alignment measurements and a memory for storing vehicle alignment angle specifications and for identifying information concerning required tools and parts for adjusting alignment angles to specifications for a plurality of vehicle makes and models. An input device is operable by a operator to provide an input signal identifying the vehicle make and model being inspected. A controller operatively connected to the sensors determines vehicle alignment angles for the vehicle under test from the vehicle alignment measurements and compares the vehicle alignment angles with the stored specifications for the vehicle being inspected. A display device operatively connected to the controller is responsive to the controller for displaying to the operator a visual indication of all the tools required to adjust a predetermined alignment angle for the vehicle being inspected.

BRIEF DESCRIPTION OF THE DRAWINGS

Similar reference characters indicate similar parts throughout the several views of the drawings.

DESCRIPTION OF THE PREFERRED EMBODIMENT

Figure 1:
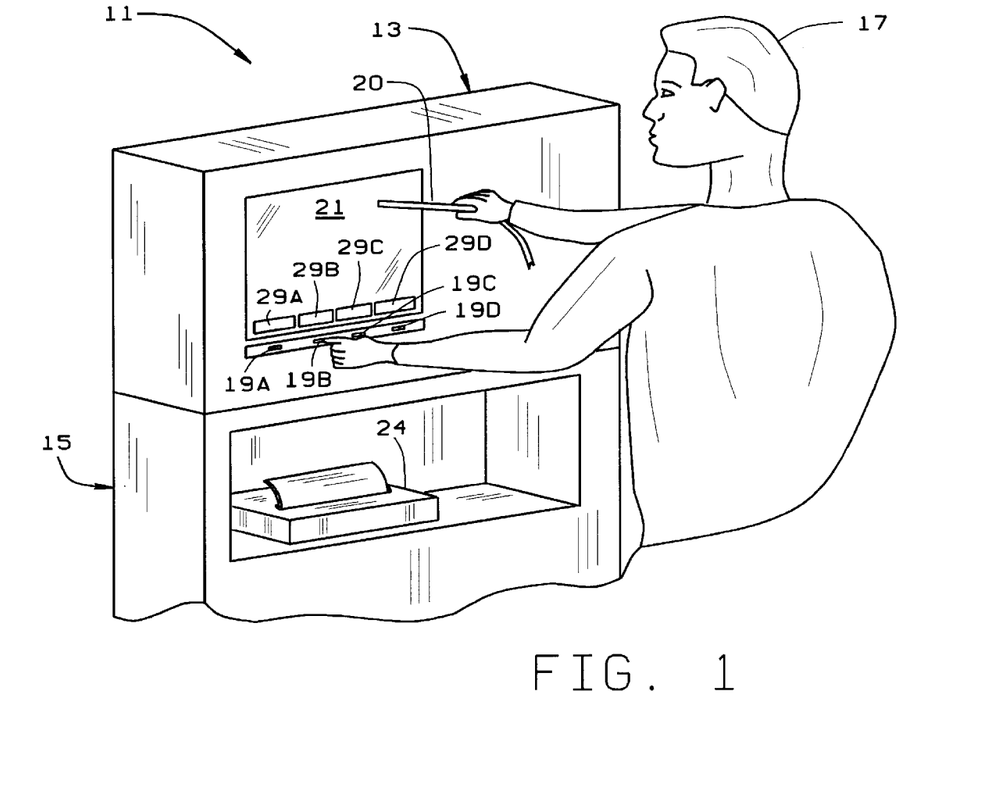
FIG. 1 is a perspective view of a inspection and vehicle alignment system console of the present invention with a technician/operator.
Figure 2:
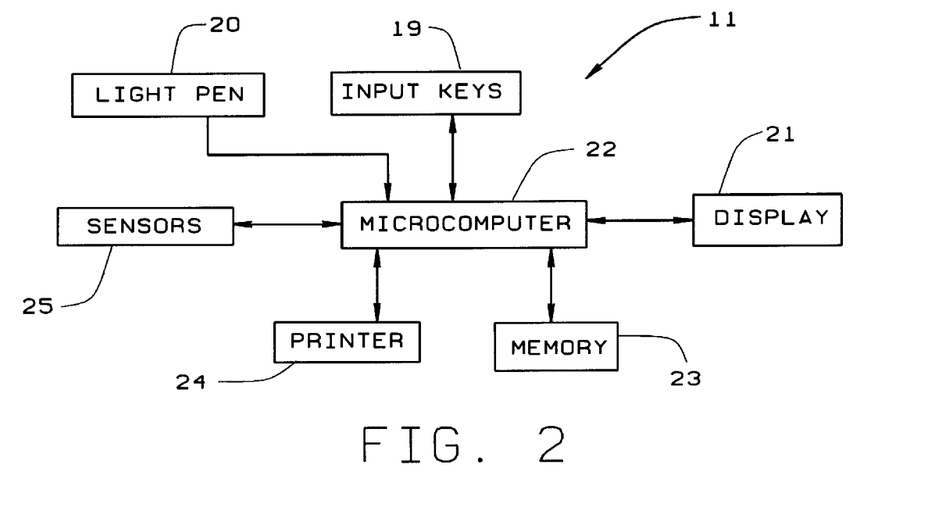
FIG. 2 is a block-diagram of the circuitry of the system of FIG. 1.

Turning to the drawings, and more particularly to FIGS. 1 and 2, there is shown a vehicle alignment and inspection facilitating system 11 of the present invention. Alignment system 11 includes a console 13 suitably mounted on a stand 15 for use by a technician/operator 17. Console 13 includes a set of manually operable input keys or switches 19(A–D), a manually operable point-and-click device 20 such as the light pen shown in FIG. 1 or a mouse (not shown), and a display 21. Display 21 is preferably a CRT computer monitor type display.

Input keys 19 and display 21 are connected to a microcomputer 22 which functions as an electronic controller to control the operation of system 11 and to guide technician 17 through the process of inspecting and aligning the vehicle under test. Microcomputer 22 is also shown in FIG. 2 connected to a digital memory 23 and to a printer 24. It should be understood that memory 23 could be internal to microcomputer 22, depending upon the particular microcomputer used. In addition, other peripheral devices, such as a CD ROM drive and the like (not shown) could be connected to microcomputer 22 as desired or needed. Suitable alignment sensors 25 are operatively connected to microcomputer 22 for supplying alignment information to the microcomputer. The use of such sensors to measure alignment characteristics is well known. See, for example, U.S. Pat. Nos. Re 33,144 to Hunter et al., and 4,381,548 to Grossman et al., the disclosures of which are incorporated herein by reference.

It should be noted that the bottom of display 21 contains four variable function blocks 29A–D (the display of which is controlled by microcomputer 22). Function blocks 29A–D are disposed directly over corresponding switches 19A–D and display to the operator the function of those switches at that particular time in the program which controls the operation of microcomputer 22. These switches or "soft keys" form one manually operable means for signalling requests to the microcomputer. The light pen, as is explained below, serves as a second such manually operable means. Either device can be used, in an otherwise conventional manner, to identify to system 11 the make and model of the particular vehicle under test. System 11 has stored in memory 23 the alignment specifications for a vast number of makes and models of vehicles (cars and light trucks). Microcomputer or controller 22 may then, after the particular make and model of the vehicle is identified, compare the measured alignment angles (determined from the measurements of sensors 25) to the specifications for those angles stored in memory 23 for that particular vehicle.

The system of the present invention is responsive to information that it receives from the technician/user 17, the sensors 25, and the customer and specifications databases. As mentioned above, database information is prestored in memory 23 for various makes and models of vehicles. Memory 23 preferably also includes additional context-sensitive information, as described below.

Vehicle alignment and inspection system 11 operates in a plurality of modes. One mode is the inspection mode and a second is the alignment mode. The system may also operate in a diagnostic mode, if desired. It is preferred that system 11 assist the technician 17 in performing inspections and alignments by providing context sensitive features. In general, system 11 performs operations and provides choices to the technician based on the vehicle selected, the condition of the vehicle and how the technician interacts with the software. A number of these context sensitive features are described below.

Figure 3:
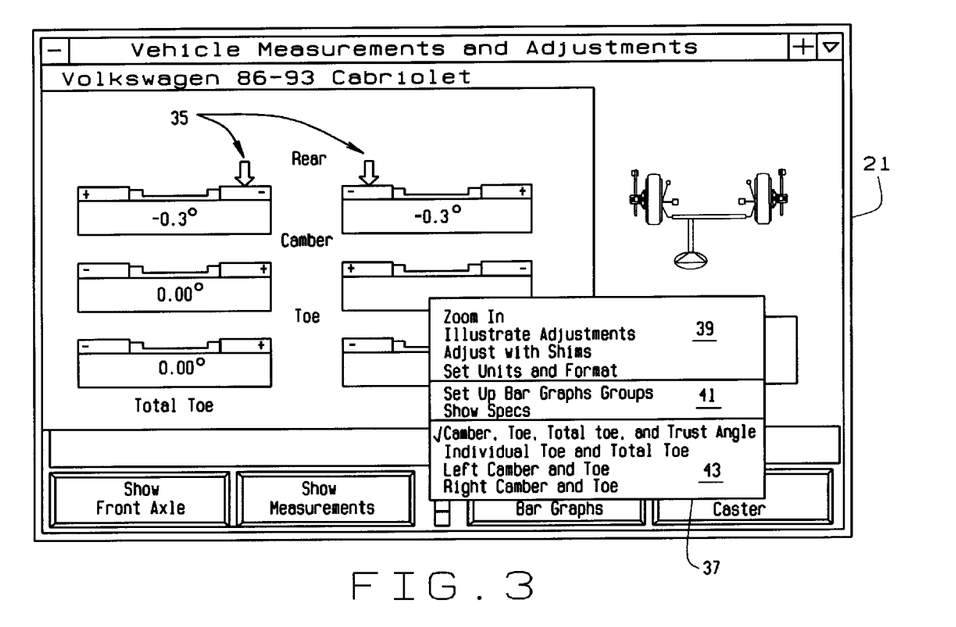
FIGS. 3–13 are examples of screens displayed by the system of FIG. 1 to the operator on the console of FIG. 1.

System 11 uses context sensitive menus to automatically provide lists of operations that correspond to alignment angles. (Such "lists", as that term is used herein, supply choices in textual or graphical form to the operator.) The use of such lists is illustrated in FIG. 3 which shows a typical bar graph display 35 (in this case a right rear toe bar graph display) on display screen 21. Using pointing device 20 technician 17 may click on bar graph 35, which signals a menu request to controller 22. In response, microcomputer 22 cause a textual menu 37 to appear (of course, non-textual menus may be used as well). Each menu 37 is divided into three sections. The first section contains the operations that apply to the alignment angle shown by the selected bar graph. For example, in FIG. 3 this first section (labeled 39) includes a "Zoom In" operation (for enlarging the area of interest in the bar graph), an "Illustrate Adjustments" operation (for assisting the technician in how to make the adjustment), an "Adjust with Shims" operation, and a "Set Units and Formats" operation. Each operation appears in first section of the menu only if it is relevant for the selected angle. The second section contains operations that apply to all bar graphs. The third section lists the available bar graph groups. The technician may select any operation (from any of the three sections) from the menu with the light-pen 20.

A set of possible operations and their meanings for the first section 39 of the menu appears below. As mentioned above, only those operations from this list which are relevant to the selected angle are displayed.

| | |
|---|---|
| Zoom In | Zoom in on the selected bar graph |
| Zoom Out | Zoom out to the previous bar group |
| Adjustment Illustration | Shows an adjustment illustration for the selected angle |
| Video Adjustments | Shows video adjustments for the angle |
| Adjust with Eccentric Cams | Appears only on relevant angles for vehicles that use eccentric cams |
| Adjust with Dual Slots | Appears only on relevant angles for vehicle with dual slots |
| Adjust with Shims | Appears only on relevant angles for vehicles that use shims to adjust the selected angle |
| Measure Caster | Appears only for the caster bar graph |
| Measure SAI/IA | Appears only for the SAI/IA bar graph |
| Set Units and Formats | Sets display format for selected angle type |
| Adjustment Tools and parts | Shows information regarding tools and parts for adjusting the selected angle |
| Alignment Analyzer | Shows the alignment analyzer screen, highlighting the selected angle |

The following operations appear in the second section of the menu (labeled 41 in FIG. 3).

| | |
|---|---|
| Set Up Bar Graph Groups | Select from the possible bar graph groups |
| Show Specs | Show the specifications on all of the bar graphs |
| Hide Specs | Remove the specifications from all of the bar graphs |

Figure 4:
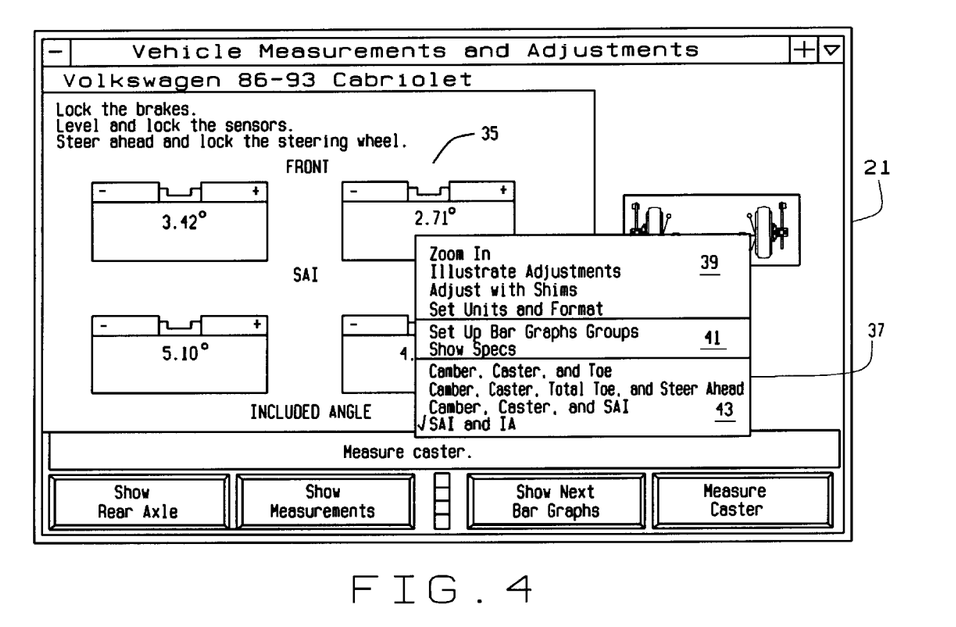

The third section of the menu, labeled 43, lists bar graph groups. The current bar graph group is noted with a check mark. The technician use the Set Up Bar Graph Groups operation to select the groups that appear in the menu. There are 31 bar graph groups available for the front axle and 13 for the rear axle. Note that in FIG. 4, which illustrates the menu 37 for the right front SAI bar graph, the third section of the menu contains different bar graph groups than are shown in FIG. 3. As described herein, the particular bar graph groups are selectable by the technician/operator and the microcomputer 22 in response displays the selected group of bar graphs together at one time on display device 21.

Menus 37, being context sensitive, are superior to the prior art in that they provide direct access to operations and information concerning a selected angle. The prior art required instead that the technician search through the various screens of the system to find a desired operation or information.

Figure 5:
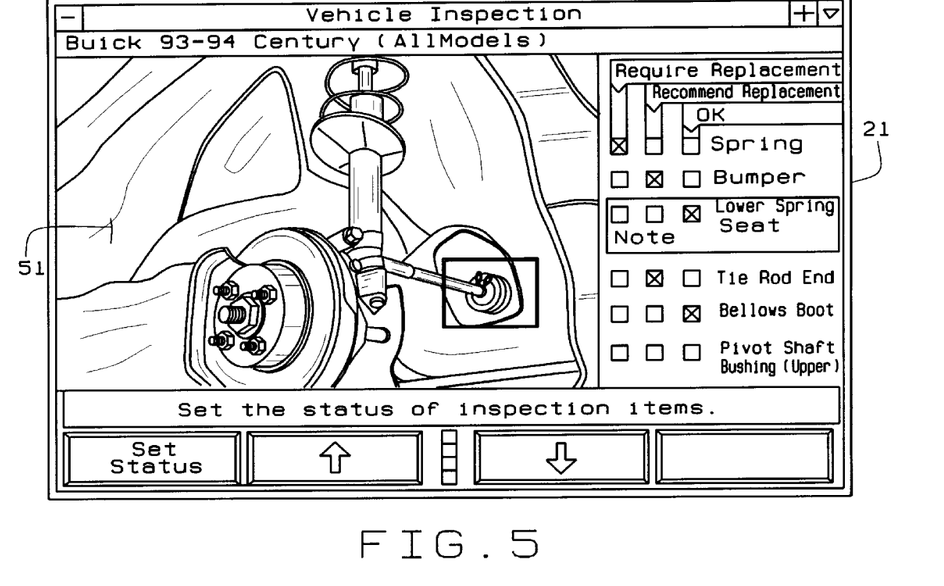
Figure 6:
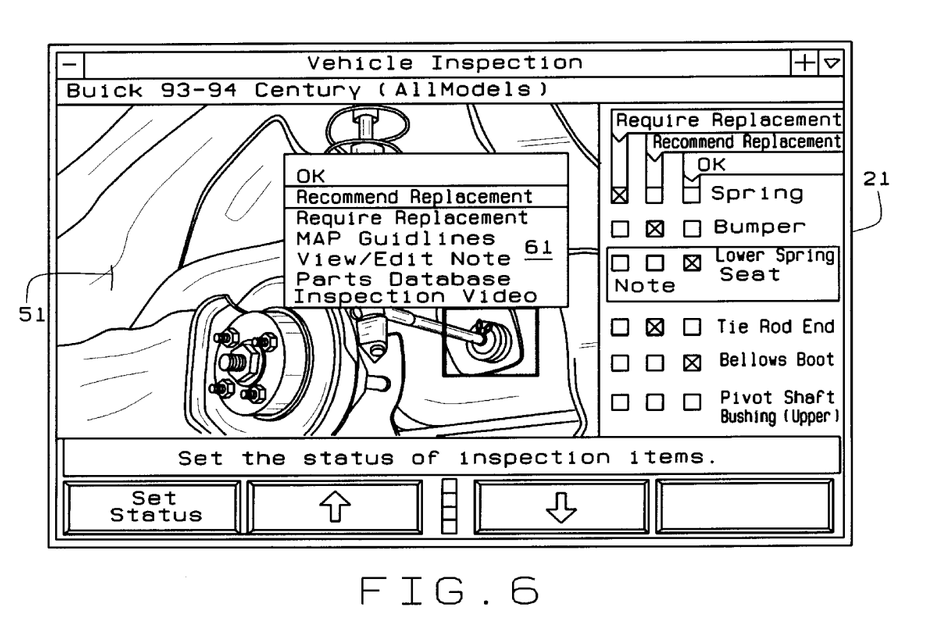

Light pen 20 may also be used to access another context sensitive feature of system 11. Memory 23 preferably has pictures (photographs or diagrammatic images such as line art) stored therein which may be accessed by the technician for purposes of inspecting the vehicle under test. This is illustrated in FIGS. 5 and 6. By pointing and clicking at automotive parts on pictures (such as the picture labeled 51) with a light-pen or a mouse, technician 17 signals the selection of that part to controller 22. When the technician points at a part and clicks with the light-pen 20, the controller recognizes which part is selected and causes the display on display device 21 of an arrow from a text label (such as the text labels "Spring", "Bumper", etc. shown in FIGS. 5 and 6) to the corresponding selected part on the picture 51. The technician at that point in the process can then use light-pen 20 to identify the status of the part of the microcomputer by clicking the corresponding box ("Require Replacement", "Recommend Replacement" or "OK") adjacent the part name. System 11 is designed so that the technician is able to page through several pictures for the vehicle and click on parts in any order. The technician can also scroll through the parts one by one and the system will automatically bring the appropriate picture into view and will draw an arrow identifying the part.

The technician is also able to use a drop down menu (as illustrated by menu 61 in FIG. 6) to quickly identify the status of a part. This menu allows technician 17 to quickly jump to context sensitive MAP (Motorist Assurance Program) guidelines for the part or enter a unique note for a part. The technician is also able to use this menu to obtain access to the inspection parts database, discussed below. The inspection information entered by the technician is recorded by microcomputer 22 in memory so that, upon request by the technician, a report may be generated (on printer 24, for example) that preferably includes the status of each part, notes entered for each part by the technician, and MAP guidelines for each part.

The inspection portion of system 11 preferably includes a large number of digital photographs to provide illustrations of parts, although the precise form of the illustrations does not form part of the present invention. The system may use diagrammatic illustration of parts such as internal brake parts that are not well illustrated by the digital photographs. Memory 23 includes information concerning the location of parts on the various illustrations so that microcomputer 22 can identify the particular part being selected by the technician. The memory (preferably organized in the form of a database) also includes the name of each part, MAP guideline linkage information as well as information that will support access to the inspection parts database, discussed below.

It is preferred that system 11 have stored in memory 23 a database having detailed information about the inspected parts. Such a database is commercially available from Cooperative Computing, Inc. of Austin, Tex. The information in this database is accessible using the light pen in the same manner as described above. The inspection parts database itself preferably includes complete information about parts from a large number of suppliers, including part names, part descriptions, part suppliers, and information about what parts are on particular vehicles.

The inspection parts database is accessible through menu 61 on the inspection screen. Specifically, the parts database is one possible selection on the drop-down menu 61. This enables the technician to view detailed information about specific selected parts. In addition, the inspection parts database can be used by microcomputer 22 (upon request by the technician/user) to generate a customized inspection list that includes only the parts that are relevant to the vehicle being inspected. In order to produce a customized inspection list, it may be necessary for the microcomputer to acquire additional vehicle identifying information from the technician in order to fully identify the vehicle to the inspection parts database.

From menu 61, technician 17 can also access MAP (Motorist Assurance Program) guidelines that provide context sensitive assistance with the inspection and repair of parts. Although the MAP guidelines have been available for some time, it is not believed that they have been available as an integral part of a vehicle inspection and alignment system. More importantly, the MAP guidelines in system 11 are context sensitive and, therefore, easier and more likely to be used by the technician.

Figure 7:
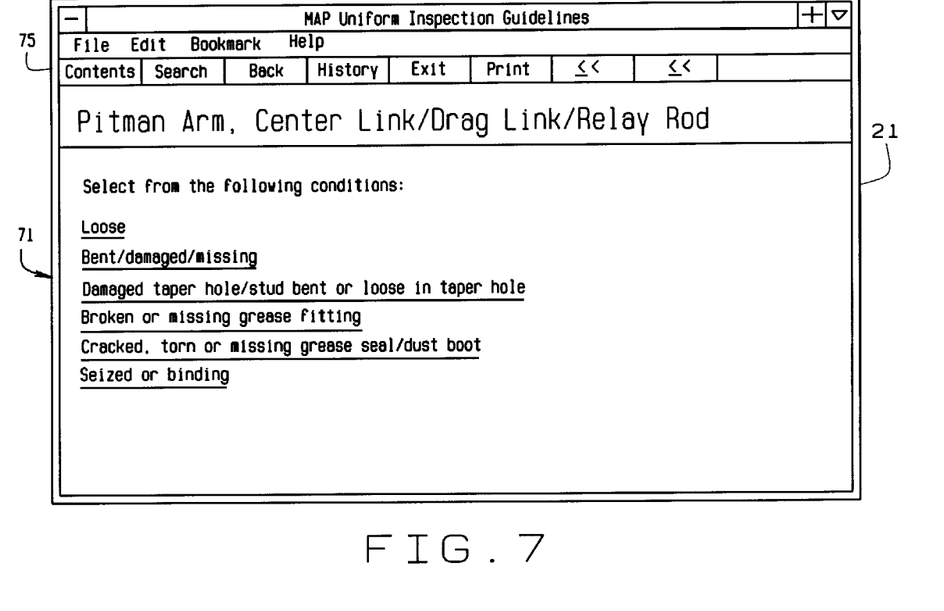
Figure 8:
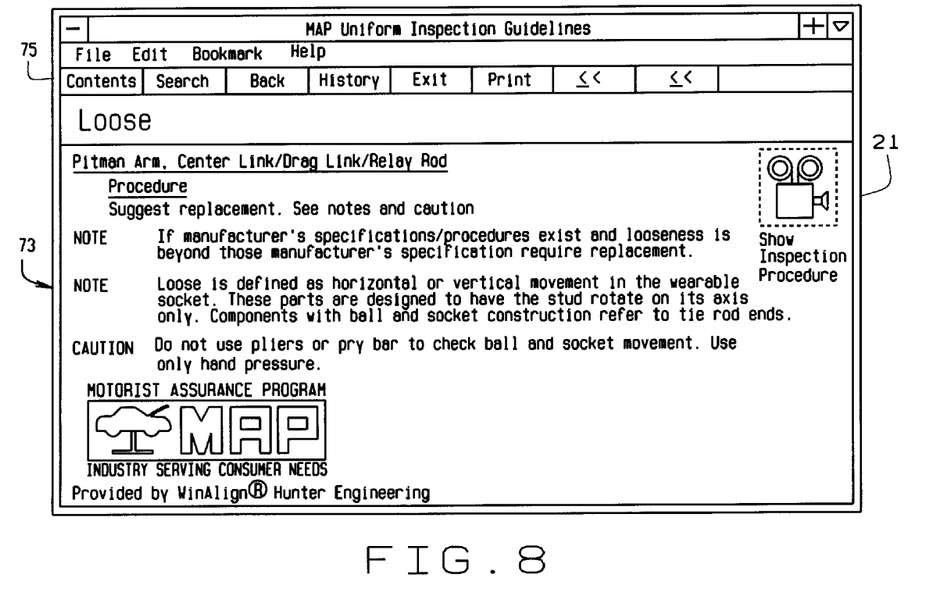

To use MAP guidelines the technician first highlights an automotive part on the inspection screen and then either presses a MAP Guidelines soft key 19 or pulls down a menu 61 and clicks on the MAP Guidelines item. This initiates a guideline request signal. The technician is then presented with a screen, such as screen 71 shown in FIG. 7, that lists several possible conditions for that part. When the technician selects one of the conditions, a screen (such as screen 73 shown in FIG. 8) is presented that provides a recommended procedure and, possibly, notes about how to inspect and repair the part. Note that screens 71 and 73 are context sensitive. The appropriate screen is displayed corresponding to the vehicle part selected by the technician. The technician is free to browse through all of the MAP guidelines using the table of contents, hypertext links and keywords searches, as indicated by the bar 75 at the top of screens 71 and 73.

System 11 has the ability to assist alignment technician 17 by providing a complete description of what is out of alignment on a vehicle and what the technician must do to bring the vehicle into alignment. After the sensors 25 have been mounted and compensated, the technician presses a softkey labeled "Save Before Measurements", which causes microcomputer 22 to save the current measurements as "before" measurements. When requested by the technician (using the softkeys), microcomputer 22 produces a report 81 that describes the condition of the vehicle. Report 81 states which angles are within specifications, which angles are not, and what actions the technician should do to completely align the vehicle. This report can be viewed on the screen 21 and can be printed on printer 24 and shown to a customer to explain the work that needs to be done.

Figure 9:
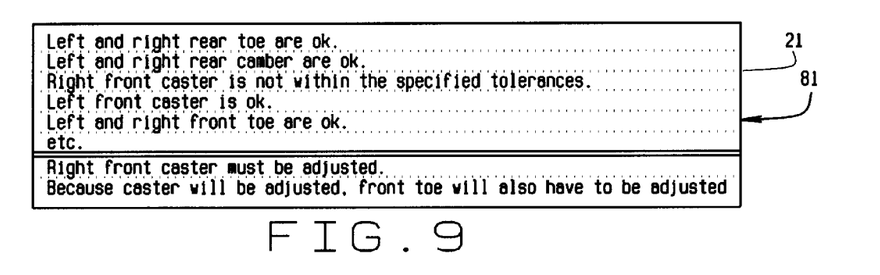

Turning specifically to the version of report 81 shown in FIG. 9, the various toe angles and left front caster are shown as being within specifications, but right front caster is shown as being out of tolerance. The bottom portion of the report accordingly instructs technician 17 that right front caster must be adjusted. In addition, system 11 has rules programmed therein which allow it to also instruct the technician that "Because caster will be adjusted, front toe will also have to be adjusted."

Figure 10:
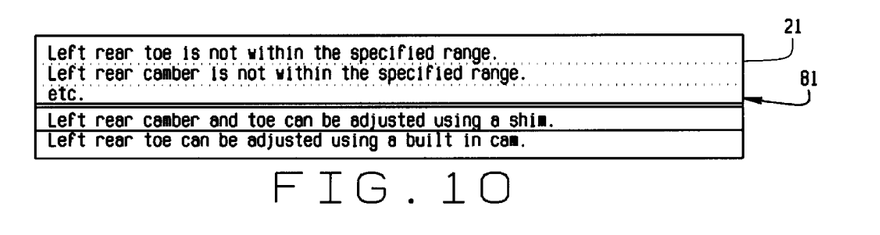

Another example of report 81 is shown in FIG. 10. In this example, the vehicle being aligned uses rear shims and a built-in cam, and the left rear toe and left rear camber are not within specifications. The report generated by microcomputer 22 in these circumstances instructs the operator to adjust camber and toe with a shim, and to make the final adjustment of toe with the built in cam. Although report 81 is shown as a standalone report, it should be realized that it can also be displayed next to a graphical representation of the vehicle on display screen 21 and could be made available from the context sensitive menus on the bar graphs shown in previous figures.

System 11 uses the results shown on report 81 (upon request by technician 17) to customize the alignment procedure based upon the condition of the vehicle. If the operator so desires, microcomputer 22 changes the alignment procedure based on what is in and out of alignment on the vehicle. For example, if all measurements on the rear of the vehicle are within spec, microcomputer 22 does not include the rear bar graph adjustment screen in the procedure. If rear toe is out of specification, the procedure will include the rear bar graph adjustment screen. If rear toe and camber are out of specification, and the vehicle uses shims, then the procedure illustrated by the system on display 21 will include the rear shim screen.

This use of the measured alignment status of the actual vehicle under test results in microcomputer 22 guiding technician 17 through the minimal steps necessary to align the vehicle. Extraneous information and unnecessary procedures steps are eliminated by the microcomputer/controller so that the technician can perform alignments quickly without making unnecessary adjustments.

It is preferred that microcomputer 22 also include in report 81 a list of the tools and parts required to adjust the angles that are not within specification. Note that only those tools and parts required to adjust the out-of-spec angles are included.

The display of the required tools and parts in connection with report 81 is only one way in which system 11 provides technician 17 easy access to information about the hand tools, special tools and adjustment kits available to assist with the adjustment of individual angles. The technician is able to access this information from the Illustrate Adjustment screen on display 21 in the normal alignment procedure, and from the context sensitive menus on the bar graph screens. This information is (like the other features discussed above) context sensitive based on the currently selected vehicle and adjustment angle.

For example, screen 91 (FIG. 11) would be displayed by microcomputer 22 in the appropriate circumstances regarding the adjustment of rear camber. Screen 91, as can be seen, sets forth various adjustment parts and kits for making the necessary adjustment, the recommended common tools for the adjustment, and special tools required for the adjustment.

Figure 12:
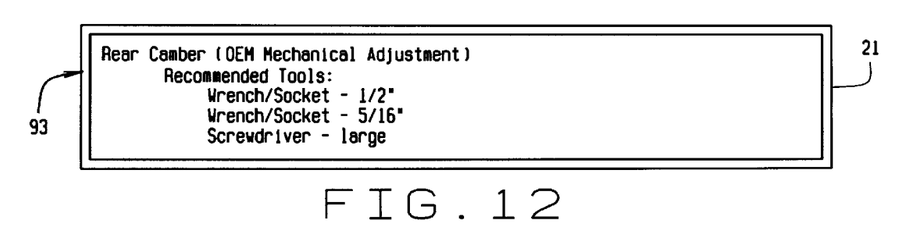

FIG. 12 illustrates a screen 93 which would be displayed instead (in the appropriate circumstances) if the adjustment could be accomplished without after market adjustment parts and special tools.

Figure 11:
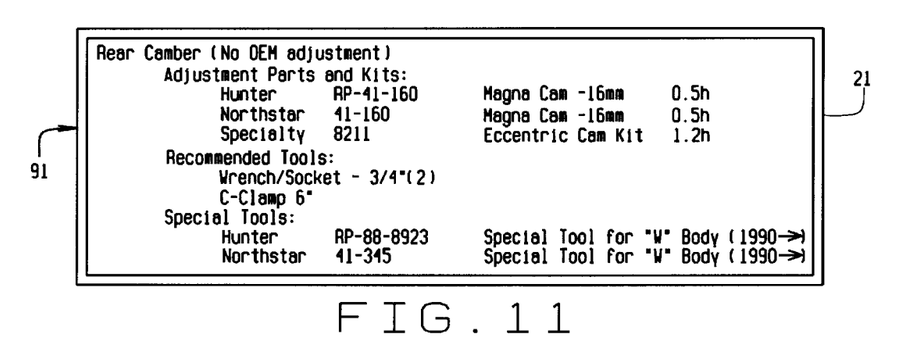

Screens such as screens 91 and 93 allow technician 17 to view the manufacturer, part number and part description for any adjustment parts or special tools. If the manufacturer supplies information regarding the time required to install a kit, that information is also displayed on the screen. System 11 also includes illustrations such as that shown on screen 97 (FIG. 13) for the various adjustment parts and tools, such as the Magna Cam kit illustration 98 shown on screen 97. Such screens also include any special instructions that are needed, such as the written instructions shown at 99.

Figure 13:
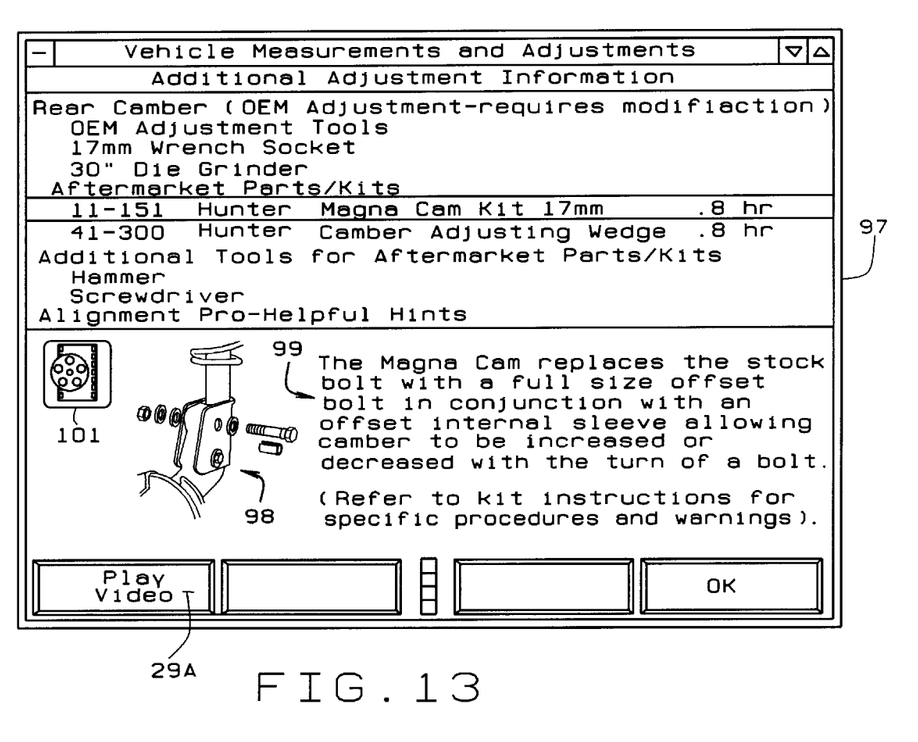

FIG. 13 also illustrates an additional feature of system 11. The system controller provides quick access to full motion video to assist the technician with the use of adjustment parts and tools. The system memory preferably has stored therein full motion video sequences, as described below, in an appropriate format such as MPEG. It is preferred that, when a video is available in memory for the displayed part, the soft key 29A legend "Play Video" be displayed. In addition, microcomputer 22 preferably causes the display of a film reel icon 101 on the display. The technician/user may select the full motion video by clicking on the icon with the light pen or by pressing the corresponding soft key, and the system will immediately cause the selected video to be displayed on the display screen. The video will instruct the operator in the proper use of the item.

Although the full motion video feature is described in connection with the Magna Cam kit, it should be realized that it is preferably available with all special parts and kits such as full contact rear shims, wedges, and undersized bolts for camber adjustment. The feature is also especially helpful for instructing the user in the use of special tools such as the different F-body turnbuckle tools used on certain vehicles. Microcomputer 22 is responsive to the particular vehicle being inspected and/or aligned to cause the display of only those full motion videos applicable to the particular vehicle involved. It should also be understood that the full motion video feature is particularly useful as well in providing instruction in the use of tools in special OEM adjustment procedures such as drilling out the strut tower to adjust camber and caster, adjusting front toe with a tie rod tool, using an eccentric at the base of a strut to adjust camber, shimming the upper control arm to adjust caster and camber, and using an eccentric on the rear lateral control arm to adjust toe.

It is also preferred that full motion videos be stored in the memory which guide the technician/user through certain inspection and/or alignment tasks. These videos may be accessed through the Help key on the screen. The microcomputer provides access to these videos on a context sensitive basis. For example, when the technician views the compensation screen and requests help, the system makes available a full motion video relating to compensating the sensors.

Although the screens shown herein illustrate the tools and parts used for a single alignment operation, it should be understood that upon request from the technician microcomputer 22 can also generate a screen or report setting forth a summary of all of the tools need to adjust all angles on the vehicle which require adjustment, based upon the initial alignment status of the vehicle. The technician can print this summary on printer 24 in order to obtain all the tools to do the entire job. This screen may also be used to access the fill motion videos stored in the memory relating to the tools, parts and kits that are relevant to the currently selected vehicle.

While the technician is viewing this screen, he can highlight items with the lightpen or the keyboard. When an item is highlighted, a static picture will automatically appear at the bottom of the screen along with a brief description of the item. If there is a full motion video available for the item, then an "icon" 101 will appear at the upper left hand corner of the image of the item. If the operator clicks on the icon for the selected item (or pressing the corresponding soft key), a corresponding full motion video will immediately be played. With this feature, the technician/user has quick access to context sensitive videos that assist the user with the adjustment of the vehicle. System 11 automatically selects the correct video based on the currently selected vehicle and the desired part or tool.

In view of the above, it will be seen that the various objects and features of the present invention are achieved and other advantageous results obtained. It will be understood that the various embodiments of the present invention described herein are illustrative only and are not to be taken in a limiting sense.

What is claimed is:

1. A vehicle alignment system comprising:

sensors for obtaining vehicle alignment data from a vehicle under test;

a controller operatively connected to the sensors for determining measured vehicle alignment angles from the vehicle alignment data;

a display for visually displaying representations of the measured vehicle alignment angles to an operator, said display being operatively connected to the controller so that the controller causes the display of representations of a plurality of different measured vehicle alignment angles at one time;

an input device operable by the operator to select the representation of a desired one of the plurality of different measured vehicle alignment angles being displayed;

a memory having stored therein, for each selectable vehicle alignment angle, a set of choices of a plurality of different operations associated with that particular selectable vehicle alignment angle;

said controller being operatively connected to the input device and to the memory such that upon selection of a selectable vehicle alignment angle by the operator, the controller retrieves the set of choices of different operations associated with the selected vehicle alignment angle and causes the display of said set of choices on the display.

2. The vehicle alignment system as set forth in claim 1 wherein the controller is responsive to the identity of the particular vehicle under test to omit from display any operation not applicable to the particular vehicle under test.

3. The vehicle alignment system as set forth in claim 1 wherein each of the different operations on a displayed set of choices is operator selectable, the controller being responsive to selection of an operation to perform the selected operation.

4. The vehicle alignment system as set forth in claim 1 wherein the memory further includes an additional set of a plurality of different operations, the operations of said additional set being applicable to all selectable vehicle alignment angles, said controller being responsive to selection of any representation to cause the display of the additional set.

5. The vehicle alignment system as set forth in claim 4 wherein each of the different operations on the additional set is operator selectable, the controller being responsive to selection of an operation from the additional set to perform the selected operation.

6. The vehicle alignment system as set forth in claim 1 wherein the memory further includes another set of choices, said another set of choices identifying predetermined sets of graphical representations, said controller being responsive to selection of any representation to cause the display of said another set of choices.

7. The vehicle alignment system as set forth in claim 6 wherein each of the sets of graphical representations on said another set of choices is operator selectable, the controller being responsive to selection of a set of graphical representations from said another set of choices to display said selected set of graphical representations.

8. The vehicle alignment system as set forth in claim 6 wherein the items of said another set of choices may be modified by the operator.

9. A vehicle alignment system comprising:
sensors for obtaining vehicle alignment data from a vehicle under test;
a controller operatively connected to the sensors for determining measured vehicle alignment angles from the vehicle alignment data;
a display for visually displaying to an operator representations of the measured vehicle alignment angles and for selectively displaying choices of alignment assisting operations associated with a measured vehicle alignment angle, said display being operatively connected to the controller so that the controller causes the display of at least some of the representations;
a manually operable input device for requesting direct access to a displayed alignment assisting operation associated with a selected alignment angle representation, said controller being responsive to a request for direct access to a particular operation to directly initiate said requested operation.

10. The vehicle alignment system as set forth in claim 9 wherein the controller causes the display of a set of choices of alignment assisting operations for selection by the operator, the controller being responsive to selection by the operator of an operation on the set of choices to directly initiate said selected operation.

11. The vehicle alignment system as set forth in claim 10 wherein the selectable alignment assisting operations include displaying video associated with a measured vehicle alignment angle.

12. The vehicle alignment system as set forth in claim 10 wherein the selectable alignment assisting operations include a selection concerning tools and parts, said controller being responsive to selection of the tools and parts selection to provide further choices to the operator, one of said choices causing the display of video illustrating the use of a special tool or part.

13. A vehicle inspection system comprising:
a storage device for storing a plurality of separate images, at least some of the separate images illustrating a plurality of vehicle parts;
a display screen for visually displaying said images to an operator;
a manually operable input device for signalling the selection of a desired portion of a displayed image;
a controller operatively connected to the manually operable input device and responsive to the locations of particular vehicle parts on the displayed image to visually identify on the display screen a vehicle part corresponding to the selected portion of the displayed image;
a memory having a set of inspection and repair guidelines stored therein, said controller being responsive to the selection of a particular vehicle part on a displayed image and a guideline request signal to cause the display of at least one inspection and repair guideline corresponding to the selected vehicle part, said guideline request signal being initiated by a operator of the inspection system;
wherein a video corresponding to a displayed guideline is selectable by the operator when said guideline is displayed, said controller being responsive to selection of said video to display said video corresponding to the guideline being displayed.

14. The vehicle inspection system as set forth in claim 13 wherein the storage device includes a set of images for at least one vehicle, the manually operable input device being operable by the operator to request the display of desired images from the set of images for the vehicle under test and to identify the conditions of selected parts illustrated on said desired images, the controller being responsive to the manually operable input device to associate the conditions with the corresponding parts independently of the order in which the operator enters vehicle part condition information.

15. The vehicle inspection system as set forth in claim 13 wherein the manually operable input device includes means for scrolling through a list of vehicle parts in sequence, the controller being responsive to the selection of a particular vehicle part by the manually operable input device to retrieve an image from the storage device which illustrates the selected vehicle part and to cause the display thereof on the display screen.

16. The vehicle inspection system as set forth in claim 13 wherein the guideline request signal is one of a plurality of guideline request signals which an operator selects from based upon the condition of the vehicle part being examined.

17. The vehicle inspection system as set forth in claim 13 wherein the manually operable input device is operable to enter operator-created notes concerning the results of the inspection, said controller being responsive to the entry of a operator-created note and the selection of a particular vehicle part on a displayed image to associate the operator-created note with the selected vehicle part.

18. The vehicle inspection system as set forth in claim 13 further including a memory having a vehicle parts database stored therein, said controller being responsive to selection of a particular vehicle part on a displayed image and a operator-initiated request for access to the vehicle parts database to display information from the vehicle parts database corresponding to the selected vehicle part.

19. The vehicle inspection system as set forth in claim 13 wherein at least some of the plurality of separate images stored in the storage device are digital photographic images.

20. The vehicle inspection system as set forth in claim 19 wherein at least some of the separate images are diagrammatic images.

21. The vehicle inspection system as set forth in claim 13 wherein the storage device has stored therein for each of a plurality of the separate images the locations of the plurality of vehicle parts on the image, and the names of the parts.

22. The vehicle inspection system as set forth in claim 21 wherein the storage device further has stored therein, for each of said separate images, guidelines for inspection and repair of said parts and supplier information with respect to said parts.

23. The vehicle inspection system as set forth in claim 13 wherein the storage device further has stored therein, for each of a plurality of separate images of vehicle parts, information concerning said parts including part names, part descriptions, and part suppliers.

24. The vehicle inspection system as set forth in claim 13 wherein the storage device further has stored therein, for each of a plurality of separate images of vehicle parts, information concerning the presence of said vehicle parts on particular makes and models of vehicles.

25. The vehicle inspection system as set forth in claim 24 wherein, in response to identification of the particular vehicle make and model under inspection, the controller retrieves from the storage device a list of parts to be inspected relevant to the particular vehicle under inspection.

26. A vehicle inspection system comprising:
    a storage device for storing a plurality of separate images, at least some of the separate images illustrating a plurality of vehicle parts;
    a display screen for visually displaying said images to an operator;
    a manually operable input device for signalling the selection of a desired portion of a displayed image;
    a controller operatively connected to the manually operable input device and responsive to the locations of particular vehicle parts on the displayed image to visually identify on the display screen a vehicle part corresponding to the selected portion of the displayed image;
    wherein the storage device further has stored therein, for each of a plurality of separate images of vehicle parts, a video illustrating inspection of that part, wherein the video clip corresponding to a selected part is selectable by the operator for display.

27. A system for facilitating vehicle alignment comprising:
    a plurality of sensors for acquiring vehicle alignment measurements;
    a memory for storing vehicle alignment angle specifications for a plurality of vehicle makes and models;
    an input device operable by a operator to provide an input signal identifying the vehicle make and model under test;
    a controller operatively connected to the sensors for determining vehicle alignment angles for the vehicle under test from the vehicle alignment measurements and for comparing the vehicle alignment angles with the stored specifications for said vehicle under test;
    a display device operatively connected to the controller and responsive thereto for displaying a visual indication of all the alignment angles for the vehicle under test which fall outside the stored specifications, a visual indication of the status of all the adjustable alignment angles for the vehicle which fall within the stored specifications, and an indication of the procedures required to correct all the alignment angles falling outside the stored specifications;
    wherein the controller controls the display device to display graphical representations of the measured alignment angle referenced to the corresponding specification for each of a plurality of alignment angles, said controller omitting the display of said graphical representations for each alignment angle which is within specifications and whose measurement is unaffected by changes in the alignment angles which are initially out of specification for the vehicle.

28. The system for facilitating vehicle alignment as set forth in claim 27 wherein the displayed procedures are relevant to adjustable alignment angles of the vehicle under test.

29. The system for facilitating vehicle alignment as set forth in claim 27 wherein the visual indications are displayed on the display device adjacent corresponding portions of a graphical representation of the vehicle.

30. The system for facilitating vehicle alignment as set forth in claim 27 wherein the controller guides the operator through the minimal number of steps necessary to align all adjustable angles of the vehicle.

31. A system for facilitating vehicle alignment comprising:
    a plurality of sensors for acquiring vehicle alignment measurements;
    a memory for storing vehicle alignment angle specifications for a plurality of vehicle makes and models;
    an input device operable by a operator to provide an input signal identifying the vehicle make and model under test;
    a controller operatively connected to the sensors for determining vehicle alignment angles for the vehicle under test from the vehicle alignment measurements and for comparing the vehicle alignment angles with the stored specifications for said vehicle under test;
    a display device operatively connected to the controller and responsive thereto for displaying a visual indication of all the alignment angles for the vehicle under test which fall outside the stored specifications, a visual indication of the status of all the adjustable alignment angles for the vehicle which fall within the stored specifications, and an indication of the procedures required to correct all the alignment angles falling outside the stored specifications;
    wherein the memory has stored therein a list of tools necessary for each of a plurality of alignment procedures, said controller being responsive to the initial alignment status of the vehicle to cause the display of identifying information for only those tools required to perform the procedures needed to adjust the alignment angles that are not within the corresponding specifications.

32. The system for facilitating vehicle alignment as set forth in claim 31 further including a printer operatively connected to the controller for printing a list of the tools required to adjust only those angles which initially are out of specification for the vehicle under test.

33. A system for facilitating vehicle alignment comprising:
    a plurality of sensors for acquiring vehicle alignment measurements;
    a memory for storing vehicle alignment angle specifications and identifying information concerning required tools and parts for adjusting alignment angles to specifications for a plurality of vehicle makes and models;
    an input device operable by a operator to provide an input signal identifying the vehicle make and model under test;
    a controller operatively connected to the sensors for determining vehicle alignment angles for the vehicle under test from the vehicle alignment measurements and for comparing the vehicle alignment angles with the stored specifications for said vehicle under test;

a display device operatively connected to the controller and responsive thereto for displaying to the operator a visual indication of the tools and parts required to adjust a predetermined alignment angle for the vehicle under test.

34. The system for facilitating vehicle alignment as set forth in claim 33 wherein the predetermined alignment angle is an alignment angle selected by the operator, the controller being responsive to a corresponding selection signal from the operator to cause the display of a visual indication of all the tools required to adjust the alignment angle selected by the operator.

35. The system for facilitating vehicle alignment as set forth in claim 33 wherein the predetermined alignment angle is an alignment angle which the comparison indicated was out of specification.

36. The system for facilitating vehicle alignment as set forth in claim 33 wherein the controller further causes the display of a visual indication of the parts required to adjust the predetermined alignment angle to specifications.

37. The system for facilitating vehicle alignment as set forth in claim 33 wherein the visual indication includes a graphical representation of said tools required to adjust the predetermined alignment angle.

38. The system for facilitating vehicle alignment as set forth in claim 33 wherein the controller controls the display device to display a visual indication all the tools and parts required to adjust all the alignment angles which are determined by the controller to be out of specification.

39. The system for facilitating vehicle alignment as set forth in claim 33 wherein the memory has stored therein a plurality of selectable videos corresponding to at least some of the tools and parts whose identifing information is stored in the memory.

40. The system for facilitating vehicle alignment as set forth in claim 39 wherein at least one of the selectable video clips illustrate the use of a tool or part.

41. A system for facilitating vehicle alignment comprising:

a plurality of sensors for acquiring vehicle alignment measurements;

a memory for storing vehicle alignment angle specifications and a plurality of training video clips, each training video clip being associated with a corresponding alignment operation;

an input device operable by a operator to provide an input signal identifying the vehicle make and model under test;

a controller operatively connected to the sensors for determining vehicle alignment angles for the vehicle under test from the vehicle alignment measurements and for comparing the vehicle alignment angles with the stored specifications for said vehicle under test;

a display device operatively connected to the controller and responsive thereto for displaying to the operator, upon request, selected video training clips to assist in aligning the vehicle under test.

42. The system for facilitating vehicle alignment as set forth in claim 41 wherein the controller is responsive to a manually initiated request and the current operation to cause the display of a training video clip corresponding to the current operation.

* * * * *